April 1, 1952     P. L. FRANCOIS     2,591,248

LUBRICATING OIL FILTER MOUNTING

Filed Nov. 30, 1949

Inventor
Paul L. Francois
By
Williams, Rich + Morse
Attorneys

Patented Apr. 1, 1952

2,591,248

UNITED STATES PATENT OFFICE 2,591,248

LUBRICATING OIL FILTER MOUNTING

Paul L. Francois, Short Hills, N. J.

Application November 30, 1949, Serial No. 130,164

2 Claims. (Cl. 210—94)

This invention relates to a lubricating-oil filter mounting adapted to be used with internal combustion engines such as those employed in automobiles. Such engines are customarily provided with a lubricating system to which oil is supplied under pressure by an oil pump which draws the oil from the engine crank-case which serves as a reservoir; and it is customary to remove impurities from the lubricating oil by providing a filter through which a portion of the pumped oil passes. Obviously, such oil filters should be readily replaceable, and it is old to provide a filter having an externally threaded end, provided with inlet and outlet passages, which may be screwed into a part mounted on or adjacent the engine which is so connected to the oil supply system that a portion of the pumped oil passes to it and through the filter and back to the oil supply system. Many ways of connecting a filter to an oil lubricating system have been devised, but these are subject to various objections.

It is customary to form in the crank-case of automobile engines an oil gallery or conduit which forms part of the lubricating system and to which lubricating oil is supplied by the oil pump. The filter mounting which is the subject of the present invention is unique in that it is adapted to be mounted directly on the crank-case where the oil gallery is located, and provides both for withdrawal from the oil gallery of the portion of the oil to be filtered and for the delivery of the filtered oil directly into the crank-case which serves as the oil reservoir. This filter mounting is provided with a threaded cavity adapted to receive the threaded end of the filter having the inlet and outlet passage; and the filter mounting has the advantage of easy installation, since it is merely necessary to provide an opening in the outer wall of the oil gallery and a threaded hole extending from the oil gallery through its inner wall into the crank-case, in order to permit installation of the filter mounting. Thus, it is a simple matter to attach the filter mounting to an engine having an oil gallery.

Figure 1:
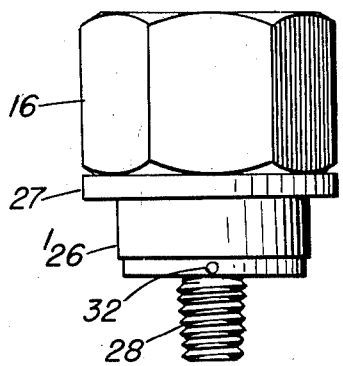
Figure 2:
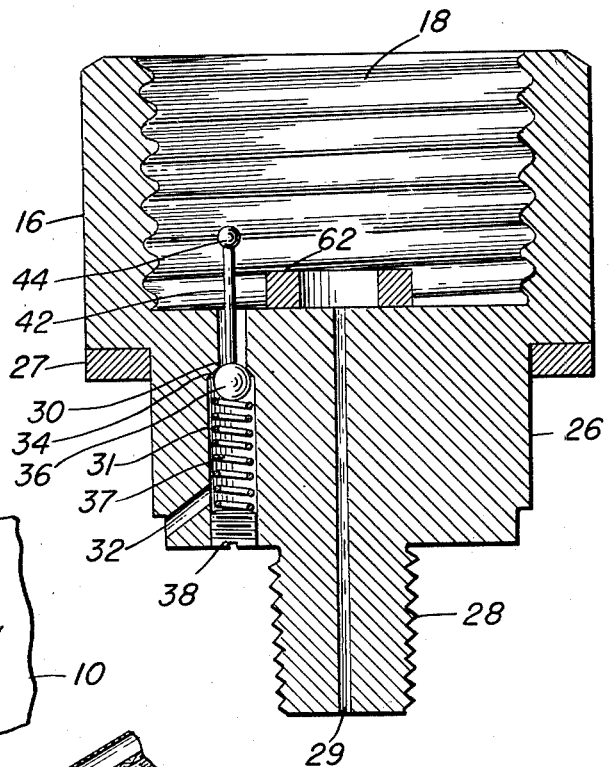
Figure 3:
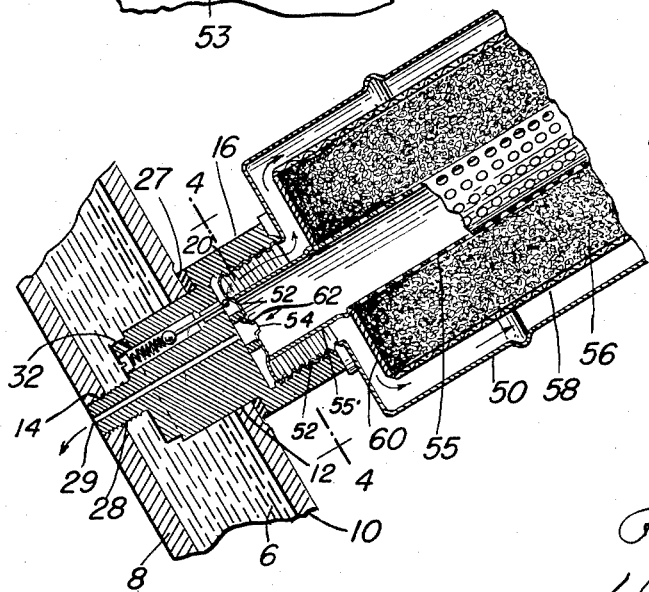

The form and construction of the oil filter mounting which is the present invention, and the manner in which it is attached to an engine, will be understood from the following description, taken in connection with the accompanying drawing in which Fig. 1 is a side elevation of the filter mounting; Fig. 2 is a sectional elevation thereof; Fig. 3 is a sectional view showing the filter mounting attached to an engine, and also showing a portion of a filter cooperating with said mounting; and Fig. 4 is a section on the line 4—4 of Fig. 3 showing the inlet and outlet openings through which oil passes to and from the filter.

Referring to the drawing, and particularly to Fig. 3, the oil gallery 6 formed in the crank-case of the engine block is shown as bounded by the inner wall 8 and the outer wall 10. Lubricating oil under pressure is supplied to the oil gallery 6 by an oil pump (not shown) drawing oil from the engine crank-case which serves as a reservoir, as hereinbefore mentioned. Preparation for the installation of the filter mounting (about to be described) requires merely the drilling of an opening 12 in the outer wall 10 of the oil gallery; and the drilling and threading of a hole 14 in the inner wall 8 of the oil gallery concentric with the opening 12 and extending from the oil gallery into the inside of the engine crank-case.

Figure 4:
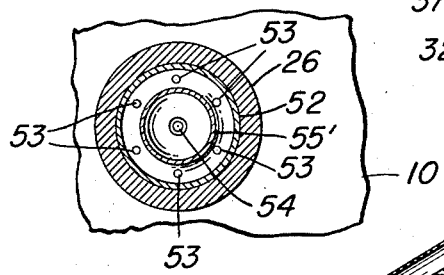

As shown in the drawing, the filter mounting which is the present invention comprises a body portion 16 having an internally threaded cavity 18 adapted to receive the externally threaded end 20 of an oil filter (of conventional form hereinafter described) provided with a threaded extension having inlet and outlet passages as shown in Fig. 4. Extending from the body portion 16 of the filter mounting is a cylindrical portion 26 which (as shown in Fig. 3) is adapted to enter the opening 12 in the outer wall 10 of the oil gallery, a gasket 27 being interposed between the wall 10 and the end of the cylindrical portion 26. Extending axially from the cylindrical portion 26, is an externally threaded tip 28 which (as shown in Fig. 3) is adapted to cooperate with the threaded hole 14 extending from the oil gallery through its inside wall 8 into the crank-case. Located axially in and extending through said body portion 16, cylindrical portion 26 and tip 28, from the cavity 18, is an oil-return passage 29 which is small enough in cross-sectional area to limit the amount of oil flowing through the oil filter to a fraction of the total oil flowing in the oil gallery. The body portion 16 and the cylindrical portion 26 are also provided with an oil-supply passage 30, 31 and 32 permitting the flow of oil from the oil gallery 6 to the threaded cavity 18, and therefrom to the inlet passages of the filter which are provided in the threaded end 20 of the latter as shown in Fig. 4. As shown in Fig. 2, at the junction of the passages 30 and 31 there is a valve seat 34 with which cooperates a movable valve member, preferably in the form of a ball 36, which is yieldingly held against said valve seat 34 by a coiled spring 37 which at one end abuts the ball 36 and at the other end abuts a plug 38 screwed into the threaded end of the oil supply passage 31. The branch passage 32 extends through the cylindrical portion 26 into the oil-supply passage 31 in which the spring 36 is located, thereby permitting oil to flow from the oil gallery 6 into the supply passage 31 below the valve seat 34. As shown in Fig. 2, the valve member 36 is provided with actuating means in the form of a valve stem 42 provided with a head 44; and the valve stem 42 extends through the oil supply passage 30 and into the threaded cavity 18. Therefore, the head 44 is adapted to be engaged by the end of an oil filter when the latter is inserted in the filter mounting, thereby moving valve member 36 positively away from its valve seat 34 against the pressure exerted on the valve member 36 by the spring 37. It will be understood that the purpose of the valve just described is to prevent oil from flowing from the oil gallery 6 and through the passage 30, 31 and 32 into the threaded cavity 18 in the filter mounting, if a filter is removed from the filter mounting while the engine is running and the lubricating oil in the oil gallery 6 is under pressure. Of course, this valve may be omitted from the filter mounting, but it is believed to be desirable to include it.

The oil filter, partly shown in Fig. 3, which forms no part of the present invention, will now be described in order that the manner in which it cooperates with the filter mounting may be understood. The outer casing 50 of said filter is provided with a threaded cup-shaped extension 52 designed to cooperate with the internally threaded cavity 18 in the filter mounting. As shown in Fig. 4, the bottom of the cup-shaped extension 52 is provided near its periphery with inlet openings 53 and a central outlet opening 54. Within the outer casing of the filter is a filtering element comprising a perforated tube 55 surrounded by filtering material 56 encased within a cylindrical screen 58 which is attached at its edges to disks 60 (only one of which is shown) which are mounted on the perforated tube 55. The unperforated end 55' of the tube 55 extends into the cup-shaped threaded end 52 of the filter casing and its end is attached thereto; and a space is provided for the flow of oil between the cup-shaped member 52 and the tube 55, and between the casing 50 and the disks 60 and the screen 58, as will be evident from Fig. 3. It will be understood that the oil to be filtered enters the filter through the inlet openings 53 and leaves the filter through the outlet opening 54. A washer 62 of suitable material is interposed between the ends of the cup-shaped extension 52 of the filter and the bottom of the threaded cavity 18 in order to separate the oil streams flowing to and from the filter. Said washer 62 may be secured either to the bottom of the cavity 18 in the filter mounting or to the cup-shaped extension 52 of the filter.

The manner in which a portion of the lubricating oil passing through the oil gallery 6 is fed to and through the oil filter will be obvious from Fig. 3. The oil enters the branch passage 32, flows through the passage 31 and passes around the valve member 36 which is then out of engagement with its valve seat 34, and flows through the passage 30 into the bottom of the cavity 18; and then through the inlet openings 53 and into the space between the filtering element and the casing of the filter. This oil flows through the screen 58 and the filtering material 56 into the perforated tube 55, and from that tube flows through the outlet opening 54 into the space in the bottom of the cavity 18 bounded by the washer 62, from which the oil flows through the oil-return passage 29 and into the crank-case of the engine. As hereinbefore explained, the passage 29 is small enough in cross-section to limit the amount of oil flowing through the filter to a fraction of the total oil flowing in the oil gallery 6.

Thus the filter mounting which has been described serves as a means for connecting the inlet passages of a renewable oil filter to the oil gallery of an engine, and for connecting the outlet passage of the filter to the crank-case of the engine.

What is claimed is:

1. In combination with the crank-case wall of an internal combustion engine having an oil gallery provided with an opening in its outer wall and with a threaded hole extending from the oil gallery into the engine crank-case, a renewable oil filter having an externally threaded end provided with inlet and outlet passages, and a filter mounting comprising a body portion having an internally threaded cavity adapted to receive the externally threaded end of said oil filter, a cylindrical portion extending from said body portion and adapted to enter and fit the opening in the outer wall of the oil gallery, and an externally threaded tip extending from said cylindrical portion and adapted to cooperate with the threaded hole extending from the oil gallery into the crank-case, said body and cylindrical portions being provided with an oil-supply passage effecting the flow of oil from the oil gallery to said threaded cavity and to the inlet passages of the filter, and said cylindrical portion and said tip being provided with an oil-return passage effecting the flow of oil from the outlet passage of the filter and from said cavity into said crank-case.

2. For use with an internal combustion engine having a crank-case wall containing an oil gallery provided with an opening in its outer wall and with a threaded hole extending from the oil gallery into the engine crank-case, an oil filter mounting having a body portion provided with an internally threaded cavity adapted to receive an externally threaded end of an oil filter, a cylindrical portion extending from said body portion and adapted to enter and fit the opening in the outer wall of said oil conduit, and an externally threaded tip extending from said cylindrical portion and adapted to screw into the threaded hole in the inner wall of said oil conduit, said body and cylindrical portions being provided with an oil supply passage adapted to effect the flow of oil from said oil conduit to said threaded cavity in the body portion of the filter mounting, and said cylindrical portion and tip being provided with an oil return passage adapted to effect the flow of oil from said threaded cavity into said crank-case.

PAUL L. FRANCOIS.

REFERENCES CITED

The following references are of record in the file of this patent:

UNITED STATES PATENTS

| Number | Name | Date |
|---|---|---|
| 1,228,837 | Schulse | June 5, 1917 |
| 1,791,046 | Sweetland | Feb. 3, 1931 |
| 1,982,376 | De Lancey | Nov. 27, 1934 |
| 2,203,668 | Burckhalter | June 11, 1940 |
| 2,211,305 | Werder | Aug. 13, 1940 |
| 2,401,674 | Vizay | June 4, 1946 |